(12) United States Patent
Zhang et al.

(10) Patent No.: US 11,088,792 B2
(45) Date of Patent: Aug. 10, 2021

(54) METHOD AND DEVICE FOR REPRESENTING QUASI CO-LOCATION PARAMETER CONFIGURATION, AND TRANSMITTING AND RECEIVING APPARATUS

(71) Applicant: ZTE Corporation, Guangdong (CN)

(72) Inventors: Nan Zhang, Guangdong (CN); Yijian Chen, Guangdong (CN); Zhaohua Lu, Guangdong (CN); Yu Ngok Li, Guangdong (CN); Hao Wu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/370,872

(22) Filed: Mar. 29, 2019

(65) Prior Publication Data

US 2019/0296868 A1 Sep. 26, 2019

Related U.S. Application Data

(63) Continuation of application No. PCT/CN2017/104742, filed on Sep. 30, 2017.

(30) Foreign Application Priority Data

Sep. 30, 2016 (CN) .................. 201610879366.X
Apr. 28, 2017 (CN) .................. 201710298911.0

(51) Int. Cl.
*H04L 12/28* (2006.01)
*H04L 5/00* (2006.01)
(Continued)

(52) U.S. Cl.
CPC .......... *H04L 5/0023* (2013.01); *H04B 7/024* (2013.01); *H04B 7/0626* (2013.01);
(Continued)

(58) Field of Classification Search
CPC ....................................... H04L 12/50
(Continued)

(56) References Cited

U.S. PATENT DOCUMENTS

2014/0092829 A1* 4/2014 Han ............... H04L 5/0035
370/329
2015/0257130 A1 9/2015 Lee et al.
(Continued)

FOREIGN PATENT DOCUMENTS

CN 104081683 A 10/2014
CN 105144612 A 12/2015
(Continued)

OTHER PUBLICATIONS

Extended Search Report dated Jan. 30, 2020 for European Application No. 17855021.6, filed on Apr. 29, 2019 (8 pages).
(Continued)

*Primary Examiner* — Dang T Ton
(74) *Attorney, Agent, or Firm* — Perkins Coie LLP

(57) ABSTRACT

The present disclosure provides a method and device for representing a quasi co-location (QCL) parameter configuration, a transmitting apparatus and a receiving apparatus. The method include: acquiring a second QCL characteristic parameter set including part or all of characteristic parameters in a first QCL characteristic parameter set; and indicating configuration information of the second QCL characteristic parameter set to a receiving terminal by signaling. The present disclosure solves the problem in the existing art that QCL information between different reference signals or different antenna ports cannot be flexibly configured.

16 Claims, 7 Drawing Sheets

(51) Int. Cl.
  *H04B 17/364*    (2015.01)
  *H04B 17/391*    (2015.01)
  *H04B 7/06*      (2006.01)
  *H04L 27/26*     (2006.01)
  *H04B 7/024*     (2017.01)

(52) U.S. Cl.
  CPC ......... *H04B 17/364* (2015.01); *H04B 17/391* (2015.01); *H04L 5/0048* (2013.01); *H04L 27/2659* (2013.01); *H04L 5/0053* (2013.01)

(58) Field of Classification Search
  USPC ....................................................... 370/401
  See application file for complete search history.

(56) References Cited

U.S. PATENT DOCUMENTS

2018/0295609 A1* 10/2018 Shimezawa ........... H04L 5/0048
2020/0100286 A1*  3/2020 Xu ................... H04W 72/1268

FOREIGN PATENT DOCUMENTS

| CN | 105471559 A   | 4/2016  |
| EP | 2950470 A1    | 12/2015 |
| WO | 2015174731 A1 | 11/2015 |

OTHER PUBLICATIONS

International Search Report and Written Opinion dated Dec. 7, 2017 for International Application No. PCT/CN2017/104742, filed on Sep. 30, 2017 (16 pages, with English translation).

* cited by examiner

METHOD AND DEVICE FOR REPRESENTING QUASI CO-LOCATION PARAMETER CONFIGURATION, AND TRANSMITTING AND RECEIVING APPARATUS

CROSS REFERENCE TO RELATED APPLICATIONS

This patent document is a continuation of and claims priority to International Patent Application No. PCT/CN2017/104742, filed on Sep. 30, 2017, which claims the benefit of priority of Chinese Patent Application No. 201610879366.X, filed on Sep. 30, 2016, and Chinese Patent Application No. 201710298911.0, filed on Apr. 28, 2017. The entire contents of the before-mentioned patent applications are incorporated by reference as part of the disclosure of this application.

TECHNICAL FIELD

The present disclosure relates to the field of communications and, in particular, to a method and device for representing a quasi co-location (QCL) parameter configuration, a transmitting apparatus and a receiving apparatus.

BACKGROUND

In the LTE/LTE-A system, different types of reference signals and the corresponding transmission antenna ports need to be configured due to the changes of transmission modes. Based on this, to better reuse different types of reference signals to estimate different channel characteristics and improve data demodulation accuracy, quasi co-location (QCL) configurations between different reference signals and antenna ports (reference signals/antenna ports) is introduced.

However, the QCL configurations corresponding to the different reference signals/antenna ports are limited by a particular QCL parameter relationship and cannot be performed according to the current channel state or the like in system transmission. In the new generation of radio access networks, the use of a beamforming technology results in large differences in time, channel characteristics and channel parameters of different reference signals/antenna ports in the system transmission have great differences in frequency domain and space domain, and the related QCL parameter configuration scheme cannot flexibly deal with this phenomenon.

No effective solution has been proposed for the problem in the existing art that QCL information between different reference signals or different antenna ports cannot be flexibly configured.

SUMMARY

Embodiments of the present disclosure provide a method and device for representing a QCL parameter configuration, a transmitting apparatus and a receiving apparatus, to solve at least the problem in the existing art that QCL information between different reference signals or different antenna ports cannot be flexibly configured.

In an aspect of the embodiments of the present disclosure, a method for representing a QCL parameter configuration is provided. The method includes: acquiring a second QCL characteristic parameter set including part or all of characteristic parameters in a first QCL characteristic parameter set; and indicating configuration information of the second QCL characteristic parameter set to a receiving terminal by signaling.

In an aspect of the embodiments of the present disclosure, a method for representing a QCL parameter configuration is provided. The method includes: dividing all transmit signals or antenna ports into X signal groups each having a QCL relationship or X antenna port groups each having a QCL relationship according to X characteristic parameter groups; and indicating configuration information of the X signal groups or X antenna port groups to a receiving terminal by signaling.

In an aspect of the embodiments of the present disclosure, a method for representing a QCL parameter configuration is provided. The method includes: dividing first type signals into Q signal groups according to occupied transmission resources, where the first type signals includes a plurality of signals and Q is a positive integer; and indicating second type signals with a QCL relationship with the signal group and/or a QCL characteristic parameter set by signaling.

In an aspect of the embodiments of the present disclosure, a method for representing a QCL parameter configuration is provided. The method includes: determining a QCL characteristic parameter set used in current transmission by demodulating signaling of a transmitting terminal; and acquiring a transmit signal group and/or an antenna port group corresponding to the QCL characteristic parameter set and determining channel information corresponding to a current transmit signal and/or a current antenna port according to the transmit signal group and/or the antenna port group.

In an aspect of the embodiments of the present disclosure, a method for representing a QCL parameter configuration is provided. The method includes: determining a QCL characteristic parameter set used in current transmission by demodulating signaling of a transmitting terminal; and acquiring a transmit signal group and/or an antenna port group corresponding to the QCL characteristic parameter set and determining channel information corresponding to a current transmit signal and/or a current antenna port according to the transmit signal group and/or the antenna port group.

In an aspect of the embodiments of the present disclosure, a method for representing a QCL parameter configuration is provided. The method includes: determining a grouping manner of first type signals and a QCL characteristic parameter set and/or a QCL signal set to which each of Q signal groups of the first type signals belongs by demodulating signaling of a transmitting terminal; and determining channel information corresponding to a current transmit signal and/or a current antenna port according to the QCL characteristic parameter set and/or the QCL signal set.

In another aspect of the embodiments of the present disclosure, a device for representing a QCL parameter configuration is provided. The device includes: a first acquisition unit and a first indication unit. The first acquisition unit is configured to acquire a second QCL characteristic parameter set including part or all of characteristic parameters in a first QCL characteristic parameter set. The first indication unit is configured to indicate configuration information of the second QCL characteristic parameter set to a receiving terminal by signaling.

In another aspect of the embodiments of the present disclosure, a device for representing a QCL parameter configuration is provided. The device includes: a first processing unit and a second indication unit. The first processing unit is configured to divide all transmit signals or antenna ports into X signal groups each having a QCL relationship or X antenna port groups each having a QCL relationship according to X characteristic parameter groups. The second indication unit is configured to indicate configuration information of the X signal groups or X antenna port groups to a receiving terminal by signaling.

In another aspect of the embodiments of the present disclosure, a device for representing a QCL parameter configuration is provided. The device includes: a second processing unit and a third indication unit. The second processing unit is configured to divide first type signals into Q signal groups according to occupied transmission resources, where the first type signals includes a plurality of signals and Q is a positive integer. The third indication unit is configured to indicate second type signals with a QCL relationship with the signal group and/or a QCL characteristic parameter set by signaling.

In another aspect of the embodiments of the present disclosure, a device for representing a QCL parameter configuration is provided. The device includes a first determining unit and a second determining unit. The first determining unit is configured to determine a QCL characteristic parameter set used in current transmission by demodulating signaling of a transmitting terminal. The second determining unit is configured to acquire a transmit signal group and/or an antenna port group corresponding to the QCL characteristic parameter set and determine channel information corresponding to a current transmit signal and/or a current antenna port according to the transmit signal group and/or the antenna port group.

In another aspect of the embodiments of the present disclosure, a device for representing a QCL parameter configuration is provided. The device includes a third determining unit and a fourth determining unit. The third determining unit is configured to determine a QCL characteristic parameter set used in current transmission by demodulating signaling of a transmitting terminal. The fourth determining unit is configured to acquire a transmit signal group and/or an antenna port group corresponding to the QCL characteristic parameter set and determine channel information corresponding to a current transmit signal and/or a current antenna port according to the transmit signal group and/or the antenna port group.

In another aspect of the embodiments of the present disclosure, a device for representing a QCL parameter configuration is provided. The device includes a fifth determining unit and a sixth determining unit. The fifth determining unit is configured to determine a grouping manner of first type signals and a QCL characteristic parameter set and/or a QCL signal set to which each of Q signal groups of the first type signals belongs by demodulating signaling of a transmitting terminal. The sixth determining unit is configured to determine channel information corresponding to a current transmit signal and/or a current antenna port according to the QCL characteristic parameter set and/or the QCL signal set.

In another aspect of the embodiments of the present disclosure, a transmitting apparatus is provided. The transmitting apparatus includes a first processor; a first memory configured to store instructions executable by the first processor; and a first transmission device configured to perform information transmission and reception according to control of the first processor. The first processor is configured to perform the following operations: acquiring a second QCL characteristic parameter set including part or all of characteristic parameters in a first QCL characteristic parameter set; and indicating configuration information of the second QCL characteristic parameter set to a receiving terminal by signaling.

In another aspect of the embodiments of the present disclosure, a receiving apparatus is provided. The receiving apparatus includes a second processor; a second memory configured to store instructions executable by the second processor; and a second transmission device configured to perform information transmission and reception according to control of the second processor. The second processor is configured to perform the following operations: determining a QCL characteristic parameter set used in current transmission by demodulating signaling of a transmitting terminal; and acquiring a transmit signal group and/or an antenna port group corresponding to the QCL characteristic parameter set and determining channel information corresponding to a current transmit signal and/or a current antenna port according to the transmit signal group and/or the antenna port group.

In the embodiments of the present disclosure, the second QCL characteristic parameter set including part or all of the characteristic parameters in the first QCL characteristic parameter set is acquired; and the configuration information of the second QCL characteristic parameter set is indicated to the receiving terminal by the signaling, thereby solving the technical problem in the existing art that QCL information between different reference signals or different antenna ports cannot be flexibly configured and achieving an effect of flexibly configuring the QCL information between different reference signals or different antenna ports.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
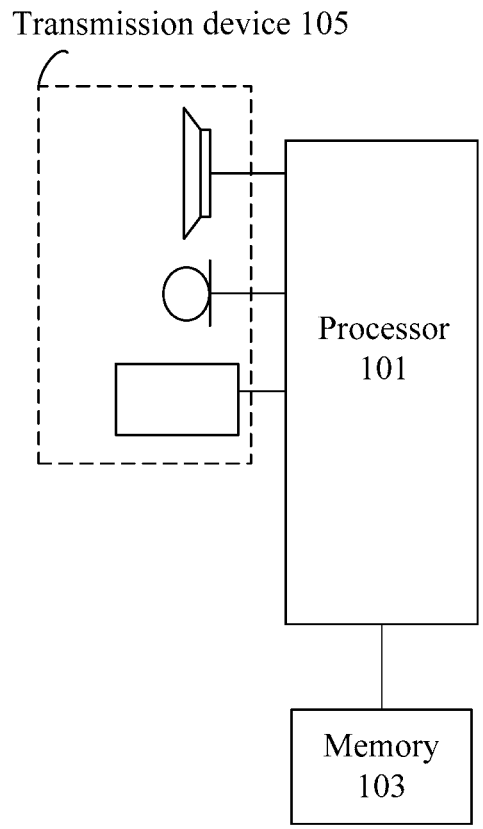
FIG. 1 is a schematic diagram of a computer terminal according to an embodiment of the present disclosure.

A method embodiment provided by the embodiment 1 of the present application may be executed in a mobile terminal (such as a wearable device), a computer terminal or other similar computing apparatuses. An example in which the method is executed in the mobile terminal is described below. As shown in FIG. 1, the mobile terminal may include one or more (only one is shown in FIG. 1) processors 101 (the processor 101 may include, but is not limited to, a processing device such as a microcontroller unit (MCU), a field programmable gate array (FPGA)), a memory 103 configured to store data, and a transmission device 105 configured to implement a communication function. It is to be understood by those skilled in the art that the structure shown in FIG. 1 is merely illustrative and not intended to limit the structure of the preceding electronic apparatus.

The memory 103 may be configured to store software programs and modules of application software, such as program instructions/modules corresponding to a device control method in the embodiments of the present disclosure. The processors 101 execute the software programs and modules stored in the memory 103 to perform various functional applications and data processing, that is, to implement the method described above. The memory may include a high-speed random access memory, and may further include a nonvolatile memory, such as one or more magnetic storage apparatuses, flash memories or other nonvolatile solid-state memories. In some examples, the memory may include memories which are remotely disposed relative to the processor and these remote memories may be connected to the computer terminal via a network. Examples of the preceding network include, but are not limited to, the Internet, an intranet, a local area network, a mobile communication network and a combination thereof.

The device is configured to receive or send data via a network. The exemplary examples of the preceding network may include a wireless network provided by a communication provider of the computer terminal. In one example, the transmission device includes a network interface controller (NIC), which may be connected to other network devices via a base station and thus be capable of communicating with the Internet. In one embodiment, the transmission device may be a radio frequency (RF) module, which is configured to communicate with the Internet in a wireless way.

To overcome limitations, the QCL configurations used in a new generation of radio access network needs to flexibly represent QCL combinations between different reference signals/antenna ports. However, currently no effective solution is provided for the problem of how to implement the required QCL parameter configuration and the related signaling configuration.

To solve the above problem, a method for representing a QCL parameter configuration is provided according to an embodiment of the present disclosure. It is to be noted that the steps illustrated in the flowcharts in the drawings may be performed by a computer system such as a group of computers capable of executing instructions, and although logical sequences are illustrated in the flowcharts, the illustrated or described steps may be performed in sequences different from those described herein in some cases.

Figure 2:
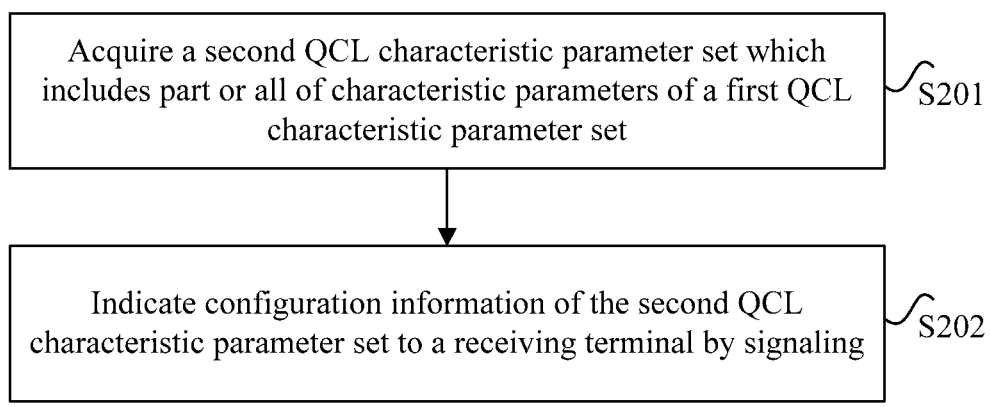
FIG. 2 is a flowchart of a method for representing a QCL parameter configuration according to an embodiment of the present disclosure.

FIG. 2 is a flowchart of a method of representing a QCL parameter configuration according to an embodiment of the present disclosure. As shown in FIG. 2, the method includes the steps described below.

In step S201, a second QCL characteristic parameter set including part or all of characteristic parameters of a first QCL characteristic parameter set is acquired.

In step S202, configuration information of the second QCL characteristic parameter set is indicated to a receiving terminal by signaling.

In the above embodiment, the second QCL characteristic parameter set including part or all of the characteristic parameters in the first QCL characteristic parameter set is acquired; and the configuration information of the second QCL characteristic parameter set is indicated to the receiving terminal by the signaling, thereby solving the technical problem in the existing art that QCL information between different reference signals or different antenna ports cannot be flexibly configured and achieving an effect of flexibly configuring the QCL information between different reference signals or different antenna ports.

The above steps may be executed by a transmitting terminal such as a base station, a micro base station and a mobile base station.

Alternatively, the characteristic parameters are used for representing characteristics of a radio propagation channel and include at least one of an average delay, an average gain, a frequency offset, frequency offset spread, a spatial parameter or delay spread.

Alternatively, the spatial parameter may be an angle of arrival, an average angle of arrival, a spatial correlation, an angle of departure and an average angle of departure.

Alternatively, the characteristic parameters are used for representing a QCL mode between signals or antenna ports.

The step S201 in which the second QCL characteristic parameter set including part or all of the characteristic parameters in the first QCL characteristic parameter set is acquired includes acquiring second QCL characteristic parameter sets configured respectively for L signals or L antenna ports, where each of the L signals or L antenna ports corresponds to at least one second QCL characteristic parameter set, where L is a positive integer.

The step S201 in which the second QCL characteristic parameter set including part or all of the characteristic parameters in the first QCL characteristic parameter set is acquired includes the steps described below. The second QCL characteristic parameter set including N characteristic parameter groups in the first QCL characteristic parameter set is acquired. The first QCL characteristic parameter set includes M characteristic parameter groups, where N is a positive number greater than 0 and less than or equal to M and M is a positive integer. A first characteristic parameter is selected from the first QCL characteristic parameter set according to a QCL mode between current transmit signals and the selected first characteristic parameter is added to the second QCL characteristic parameter set. A second characteristic parameter is selected from the first QCL characteristic parameter set according to a transmission mode and the selected second characteristic parameter is added to the second QCL characteristic parameter set. A third characteristic parameter is selected from the first QCL characteristic parameter set according to feedback information from a terminal and the third characteristic parameter is added to the second QCL characteristic parameter set. A fourth characteristic parameter is selected from the first QCL characteristic parameter set according to functions of the current transmit signals and the fourth characteristic parameter is added to the second QCL characteristic parameter set. A fifth characteristic parameter is selected from the first QCL characteristic parameter set according to an agreement with the receiving terminal and the fifth characteristic parameter is added to the second QCL characteristic parameter set.

Alternatively, before the second QCL characteristic parameter set including the N characteristic parameter groups in the first QCL characteristic parameter set is acquired, the first QCL characteristic parameter set is divided into the M characteristic parameter groups according to the agreement with the receiving terminal, where each of the M characteristic parameter groups includes m types of characteristic parameters, where m is a positive integer.

The step S202 in which the configuration information of the second QCL characteristic parameter set is indicated to the receiving terminal by the signaling includes sending higher-layer signaling for indicating characteristic parameters or characteristic parameter groups in the second QCL characteristic parameter set to the receiving terminal.

The step S202 in which the configuration information of the second QCL characteristic parameter set is indicated to the receiving terminal by the signaling includes indicating, by preset signaling, a signal set with a QCL relationship and to which the second QCL characteristic parameter set is applicable or an antenna port set with a QCL relationship and to which the second QCL characteristic parameter set is applicable, where the preset signaling includes the higher-layer signaling and/or physical-layer signaling.

In addition to the above method for the transmitting terminal, in an aspect of the embodiments of the present disclosure, a method for representing a QCL parameter configuration is provided and the method is applied to a receiving terminal. The method includes the steps described below. A QCL characteristic parameter set used in current transmission is determined by demodulating signaling of a transmitting terminal. A transmit signal group and/or an antenna port group corresponding to the QCL characteristic parameter set is acquired and channel information corresponding to a current transmit signal and/or a current antenna port is determined according to the transmit signal group and/or the antenna port group.

The above method is applied to the receiving terminal (a receiving device) such as a user terminal and a mobile terminal, for example, a mobile phone, a tablet computer, etc.

Alternatively, characteristic parameters in the QCL characteristic parameter set and the channel information are used for representing characteristics of a radio propagation channel.

Alternatively, the characteristic parameters include at least one of an average delay, an average gain, a frequency offset, frequency offset spread, a spatial parameter or delay spread.

Alternatively, the spatial parameter may be an angle of arrival, an average angle of arrival, a spatial correlation, an angle of departure and an average angle of departure.

Alternatively, signal types of transmit signals in the transmit signal group include: a downlink synchronization signal, an uplink random access signal, a downlink data demodulation pilot signal, a downlink control demodulation pilot signal, a downlink measurement pilot signal, an uplink data demodulation pilot signal, an uplink control demodulation pilot signal and an uplink measurement pilot signal.

Alternatively, the antenna port group includes one of: a port configured to send the downlink synchronization signal, a port configured to send the uplink random access signal, a port configured to send the downlink data demodulation pilot signal, a port configured to send the downlink control demodulation pilot signal, a port configured to send the downlink measurement pilot signal, a port configured to send the uplink data demodulation pilot signal, a port configured to send the uplink control demodulation pilot signal, a port configured to send the uplink measurement pilot signal, a port configured to send uplink user data, a port configured to send downlink user data, a port configured to send uplink user control information and a port configured to send downlink user control information.

Alternatively, the step in which the transmit signal group and/or the antenna port group corresponding to the QCL characteristic parameter set is acquired includes acquiring channel information of at least one transmit signal group and/or at least one antenna port group corresponding to at least one QCL characteristic parameter set.

Alternatively, the method further includes measuring the channel information of the current transmit signal and/or the current antenna port; and feeding back a QCL characteristic parameter set of the current transmit signal and/or the current antenna port to the transmitting terminal.

The channel information (values of all characteristic parameters) is measured. It is determined whether values corresponding to the signals or ports are equal. If the signals or ports have the same or similar characteristics, it is defined in a feedback process that the signals or ports have a QCL relationship with respect to the same or similar characteristic parameters, that is, the QCL characteristic parameter set is learned.

In the above embodiment, QCL parameter sets used in the current transmission and the signal group and antenna port group having the QCL relationships for QCL each parameter set are represented. By means of the technical solution of the present application, a system may configure transmit signal groups and port groups with flexible QCL characteristics, improving channel estimation accuracy in the system and optimizing transmission performance.

In an exemplary implementation process, the transmitting terminal may notify the terminal of configuration information of a currently used QCL parameter set by signaling.

The method will be described below with reference to FIG. 3. The system may arbitrarily use N radio channel characteristic parameters to form I groups of available QCL parameters in the following configuration manner.

Figure 3:
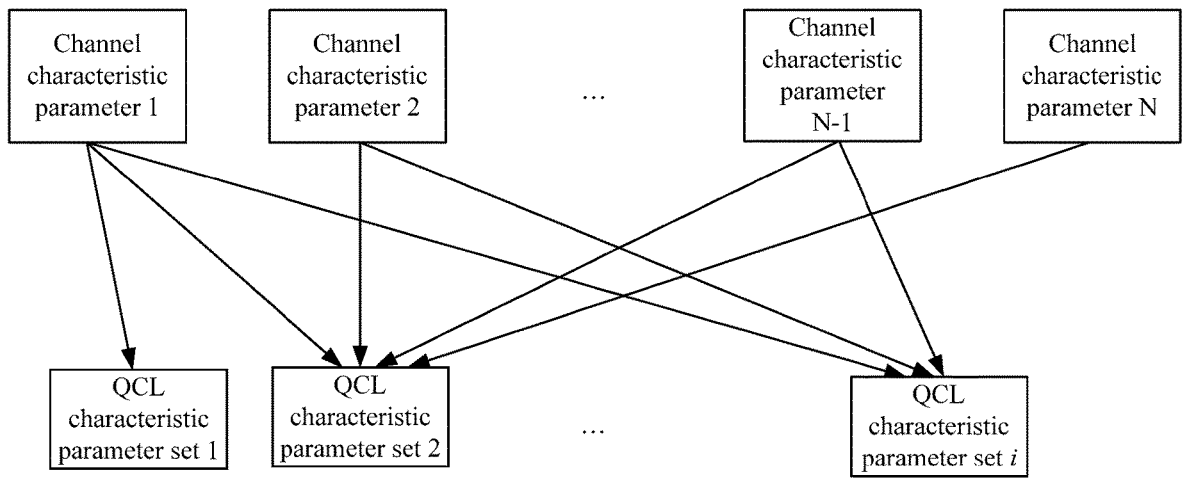
FIG. 3 is a schematic diagram of QCL parameter combinations according to an embodiment of the present disclosure.

As shown in FIG. 3, each QCL characteristic parameter set may include i ($1 \leq i \leq N$) radio channel characteristic parameters. For example, a QCL characteristic parameter set 1 includes a channel characteristic parameter 1; a QCL characteristic parameter set 2 includes a channel characteristic parameter 2 and a channel characteristic parameter i; and a QCL characteristic parameter set N−1 includes the channel characteristic parameter 2 and the channel characteristic parameter i.

Figure 4:
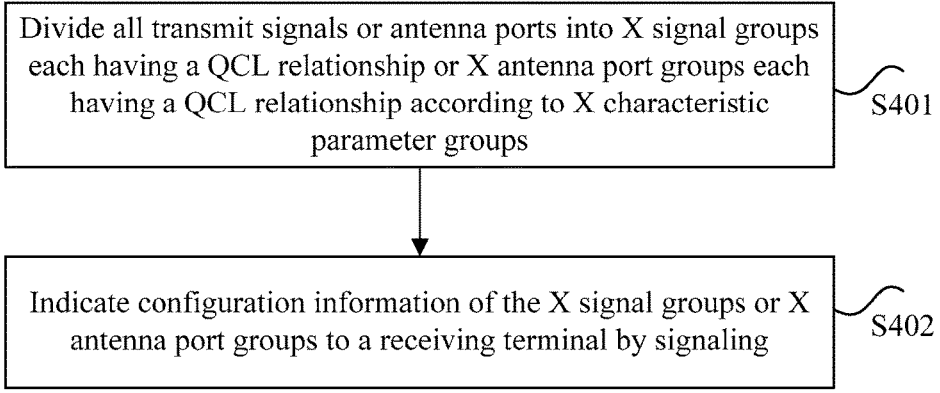
FIG. 4 is a flowchart of a method for representing a QCL parameter configuration according to an embodiment of the present disclosure.

The embodiments of the present disclosure further provide a method of representing a QCL parameter configuration. FIG. 4 is a flowchart of a method of representing a QCL parameter configuration according to an embodiment of the present disclosure. As shown in FIG. 4, the method includes the steps described below.

In step S401, according to X characteristic parameter groups, all transmit signals are divided into X signal groups each group having a QCL relationship or all antenna ports are divided into X antenna port groups each group having a QCL relationship, where X is a positive integer.

In step S402, configuration information of the X signal groups or configuration information of X antenna port groups is indicated to a receiving terminal by signaling.

In the above embodiment, according to the X characteristic parameter groups, all the transmit signals or antenna ports are divided into the X signal groups or X antenna port groups each grouping having the QCL relationship; the configuration information of the X signal groups or antenna port groups is indicated to the receiving terminal by the signaling, thereby solving the technical problem in the existing art that QCL information between different reference signals or different antenna ports cannot be flexibly configured and achieving an effect of flexibly configuring the QCL information between different reference signals or different antenna ports.

The above steps may be executed by a transmitting terminal such as a base station, a micro base station and a mobile base station.

There are various dynamic characteristic parameter configuration methods, one is to number these QCL characteristic parameters and indicate the numbers of theses characteristic parameters in the signaling. When an agreement or the like is adopted, possible combinations of these QCL characteristic parameters are exhaustively listed and numbered, and then only the number of a currently used combination is to be notified by the signaling.

Alternatively, characteristic parameters in the X characteristic parameter groups include at least one of: an average delay, an average gain, a frequency offset, frequency offset spread, a spatial parameter or delay spread.

Alternatively, the spatial parameter may be an angle of arrival, an average angle of arrival, a spatial correlation, an angle of departure and an average angle of departure.

In addition, the configuration information of the second QCL characteristic parameter set may be indicated to the receiving terminal in a manner agreed by the transmitting terminal and the receiving terminal in one of the cases described below.

The antenna port group or the antenna port group has a unique QCL relationship according to an agreement between the transmitting terminal and the receiving terminal.

The signal group or the antenna port group has no QCL relationship.

The second QCL parameter sets have a unique one-to-one mapping relationship with the signal group or the antenna port group.

Alternatively, the second QCL parameter set corresponding to the transmit signals or the antenna ports has one of the configuration conditions described below.

When signals or ports are a combination of a data demodulation pilot and a measurement pilot for measuring phase noise, the second QCL parameter set configured by the transmitting terminal includes at least the frequency offset spread and the frequency offset and does not include the delay spread and the average delay.

When the signals or the ports are the combination of the data demodulation pilot and the measurement pilot for measuring phase noise and, the second QCL parameter set configured by the transmitting terminal includes at least the frequency offset spread, the frequency offset, the delay spread and the average delay.

Additionally/alternatively, QCL parameters corresponding to the transmit signals have one of the configuration conditions described below.

When the signals or the ports are a combination of a downlink synchronization signal and a downlink measurement pilot, the second QCL parameter set configured by the transmitting terminal includes at least the frequency offset and the average delay.

When the signals or the ports are the combination of the downlink synchronization signal and the downlink measurement pilot, the second QCL parameter set configured by the transmitting terminal includes at least the frequency offset.

For example, considering practical applications, QCL parameter sets (including some or all QCL parameters) listed in table 1 may be used as a QCL parameter selection basis in a dynamic configuration manner or an agreement manner. Whether the QCL parameter set includes the spatial parameter is determined by the transmitting terminal according to a current transmission mode or a feedback of the receiving terminal.

Alternatively, when the transmitting terminal and/or the receiving terminal do not use analog beamforming, the transmitting terminal does not configure the QCL parameter set to include the spatial parameter when grouping the characteristic parameters, and otherwise, the transmitting terminal configures the QCL parameter set to include the spatial parameter.

Alternatively, when the transmitting terminal does not receive a beam measurement result from the receiving terminal, the transmitting terminal does not configure the QCL parameter set to include the spatial parameter when grouping the characteristic parameters, and otherwise, the transmitting terminal configures the QCL parameter set to include the spatial parameter.

TABLE 1

Exemplary QCL parameter sets

| QCL Parameter Set | QCL Parameter |
| --- | --- |
| Type 1 or 1' | [2] or [2] [6] |
| Type2 or 2' | [2][4] or [2][4][6] |
| Type 3 or 3' | [1][2] or [1][2][6] |
| Type 4 or 4' | [1-4] or [1-4] [6] |
| Type 5 or 5' | [1-5] or [1-6] |
| Type 6 | [6] |

In table 1, the QCL parameter [1] denotes the frequency offset spread, the QCL parameter [2] denotes the frequency offset, the QCL parameter [3] denotes the delay spread, the QCL parameter [4] denotes the average delay, the QCL parameter [5] denotes the average gain and the QCL parameter [6] denotes the spatial parameter. When the system uses analog beams, the QCL parameter [6] may be activated when configuring the QCL parameter sets.

Alternatively, the characteristic parameters in the characteristic parameter groups are configured in the following manners. When X=1, the characteristic parameter group includes the average delay, the average gain, the frequency offset, the frequency offset spread and the delay spread. When X=2, a first characteristic parameter group includes the average delay and the frequency offset and a second characteristic parameter group includes the frequency offset spread and the delay spread; alternatively the first characteristic parameter group includes the average delay, the frequency offset, the frequency offset spread, and the delay spread and the second characteristic parameter group includes the average gain; alternatively the first characteristic parameter group includes the average delay and the delay spread and the second characteristic parameter group includes the frequency offset and the frequency offset spread. When X=3, a first characteristic parameter group includes the average delay and the delay spread, a second characteristic parameter group includes the frequency offset and the frequency offset spread and a third characteristic parameter group includes the average gain; alternatively the first characteristic parameter group includes the average delay and the frequency offset, the second characteristic parameter group includes the delay spread and the frequency offset spread and the third characteristic parameter group includes the average gain.

Alternatively, the method further includes: dividing the characteristic parameters into groups in one of the following manners: all the characteristic parameters are grouped into X characteristic parameter groups according to the agreement with the receiving terminal; all the characteristic parameters are grouped into X characteristic parameter groups according to a preset configuration stored locally; all the characteristic parameters are grouped into X characteristic parameter groups according to feedback information from the receiving terminal; all the characteristic parameters are grouped into X characteristic parameter groups according to a transmission mode of the receiving terminal; and all the characteristic parameters are grouped into X characteristic parameter groups according to factors affecting the characteristic parameters.

For example, based on the preceding grouping rule, six QCL parameter sets in table 1 may be obtained. Whether the QCL parameter set includes the spatial parameter may be determined according to the transmission mode currently used by the receiving terminal. The transmission mode includes, for example, whether the transmitting terminal or the receiving terminal uses the analog beamforming.

Alternatively, when the transmitting terminal and/or the receiving terminal do not use the analog beamforming, the system does not activate the spatial parameter when grouping the characteristic parameters, and otherwise activates the spatial parameter.

Alternatively, the transmit signals include: a downlink synchronization signal, an uplink random access signal, a downlink data demodulation pilot signal, a downlink control demodulation pilot signal, a downlink measurement pilot signal, an uplink data demodulation pilot signal, an uplink control demodulation pilot signal and an uplink measurement pilot signal.

Alternatively, the signal groups include at least one of: signals of a same type and sent through different ports; signals of a same type and periodically and aperiodically sent; signals of a same type and sent at different transmission time positions through a same signal port; signals of a same type and sent at different transmission frequency domain positions through a same signal port; signals of different types; or signals of different types and periodically and aperiodically sent.

Alternatively, the step of indicating the configuration information of the signal groups to the receiving terminal by the signaling includes indicating, by one or more sets of instructions, I signal groups to which any type of signals belongs to the receiving terminal, where the I signal groups have different QCL relationships and I is a positive integer greater than 0 and less than or equal to X.

Alternatively, the characteristic parameter groups and the transmit signals have one of the correspondences described below.

When one of the X characteristic parameter groups includes at least the frequency offset spread and the frequency offset and does not include the delay spread and the average delay, the transmitting terminal configures the data demodulation pilot and the measurement pilot for measuring the phase noise or ports corresponding to the data demodulation pilot and the measurement pilot for measuring the phase noise as a combination of transmit signals or antenna ports associated with the characteristic parameter group.

When one of the X characteristic parameter groups includes at least the frequency offset spread, the frequency offset, the delay spread and the average delay, the transmitting terminal configures the data demodulation pilot and the measurement pilot for measuring the phase noise or the ports corresponding to the data demodulation pilot and the measurement pilot for measuring the phase noise as the combination of transmit signals or antenna ports associated with the characteristic parameter group.

When one of the X characteristic parameter groups includes at least the frequency offset and the average delay, the transmitting terminal configures the downlink synchronization signal and the downlink measurement pilot or ports corresponding to the downlink synchronization signal and the downlink measurement pilot as the combination of transmit signals or antenna ports associated with the characteristic parameter group.

When one of the X characteristic parameter groups includes at least the frequency offset, the transmitting terminal configures the downlink synchronization signal and the downlink measurement pilot or the ports corresponding to the downlink synchronization signal and the downlink measurement pilot as the combination of transmit signals or antenna ports associated with the characteristic parameter group.

For example, based on the six QCL parameter sets in table 1, the transmitting terminal may configure QCL parameter relationships corresponding to the following signal sets or antenna sets by the signaling.

TABLE 2

Exemplary QCL parameter configurations corresponding to the signal sets or antenna sets

| QCL Parameter Set | QCL Parameter | Signal set or Antenna Set |
| --- | --- | --- |
| Type 1 or 1' | [2] or [2][6] | (DL synchronization signal, DL synchronization signal) <br> (DL synchronization signal, DL measurement pilot) |
| Type 2 or 2' | [2][4] or [2][4][6] | (DL synchronization signal, DL measurement pilot) |
| Type 3 or 3' | [1][2] or [1][2][6] | (DL measurement pilot, DL data demodulation pilot signal) <br> (DL measurement pilot, DL measurement pilot) <br> (DL data demodulation pilot signal, DL measurement pilot for measuring phase noise) |
| Type 4 or 4' | [1-4] or [1-4][6] | (DL measurement pilot, DL data demodulation pilot signal) <br> (DL measurement pilot, DL measurement pilot) <br> (DL synchronization signal, DL measurement pilot) <br> (DL data demodulation pilot signal, DL |

TABLE 2-continued

Exemplary QCL parameter configurations corresponding
to the signal sets or antenna sets

| QCL Parameter Set | QCL Parameter | Signal set or Antenna Set |
|---|---|---|
| Type 5 or 5' | [1-5] or [1-6] | measurement pilot for measuring phase noise) (DL data demodulation pilot signal, DL data demodulation pilot signal) (DL measurement pilot, DL measurement pilot for measuring phase noise) (DL data demodulation pilot signal, DL measurement pilot for measuring phase noise) |
| Type 6 | [6] | (DL measurement pilot, UL measurement signal) (DL measurement pilot, downlink measurement pilot) |

In table 2, the QCL parameter [1] denotes the frequency offset spread, the QCL parameter [2] denotes the frequency offset, the QCL parameter [3] denotes the delay spread, the QCL parameter [4] denotes the average delay, the QCL parameter [5] denotes the average gain and the QCL parameter [6] denotes the spatial parameter. When the system uses the analog beams, the parameter [6] may be activated when the QCL parameter sets are configured.

Alternatively, the antenna port includes one of: a port configured to send the downlink synchronization signal, a port configured to send the uplink random access signal, a port configured to send the downlink data demodulation pilot signal, a port configured to send the downlink control demodulation pilot signal, a port configured to send the downlink measurement pilot signal, a port configured to send the uplink data demodulation pilot signal, a port configured to send the uplink control demodulation pilot signal, a port configured to send the uplink measurement pilot signal, a port configured to send uplink user data, a port configured to send downlink user data, a port configured to send uplink user control information and a port configured to send downlink user control information.

Alternatively, the antenna port groups include at least one of: different ports through which signals of a same type are sent at different transmission time positions; different ports through which signals of a same type are sent at different transmission frequency domain positions; different ports through which signals of different types are sent at different transmission time positions; or different ports through which signals of different types are sent at different transmission frequency domain positions.

Alternatively, the step of indicating the configuration information of the antenna port groups to the receiving terminal by the signaling includes indicating, by the one or more sets of instructions, J antenna port groups to which any type of signals belongs to the receiving terminal, where the J antenna port groups have different QCL relationships and J is a positive integer greater than 0 and less than or equal to X.

Alternatively, the method further includes configuring resources for transmitting each of first type signals according to a QCL signal set to which the first type signals belongs and/or a QCL characteristic parameter set corresponding to the first type signals.

With respect to the above method (including the step S401 and the step S402) for the transmitting terminal, in an aspect of the embodiments of the present disclosure, a method for representing a QCL parameter configuration is provided and the method is applied to a receiving terminal. The method includes the steps described below. A QCL characteristic parameter set used in current transmission is determined by demodulating signaling of a transmitting terminal. A transmit signal group and/or an antenna port group corresponding to the QCL characteristic parameter set is acquired and channel information corresponding to a current transmit signal and/or a current antenna port is determined according to the transmit signal group and/or the antenna port group.

The above method is applied to the receiving terminal (a receiving device) such as a user terminal and a mobile terminal, for example, a mobile phone, a tablet computer, etc.

Alternatively, characteristic parameters in the QCL characteristic parameter set and the channel information are used for representing characteristics of a radio propagation channel.

Alternatively, the characteristic parameters include at least one of an average delay, an average gain, a frequency offset, frequency offset spread, a spatial parameter, or delay spread.

Alternatively, the spatial parameter may be an angle of arrival, an average angle of arrival, a spatial correlation, an angle of departure and an average angle of departure.

Alternatively, signal types of transmit signals in the transmit signal group include: a downlink synchronization signal, an uplink random access signal, a downlink data demodulation pilot signal, a downlink control demodulation pilot signal, a downlink measurement pilot signal, an uplink data demodulation pilot signal, an uplink control demodulation pilot signal and an uplink measurement pilot signal.

Alternatively, the antenna port group includes one of: a port configured to send the downlink synchronization signal, a port configured to send the uplink random access signal, a port configured to send the downlink data demodulation pilot signal, a port configured to send the downlink control demodulation pilot signal, a port configured to send the downlink measurement pilot signal, a port configured to send the uplink data demodulation pilot signal, a port configured to send the uplink control demodulation pilot signal, a port configured to send the uplink measurement pilot signal, a port configured to send uplink user data, a port configured to send downlink user data, a port configured to send uplink user control information and a port configured to send downlink user control information.

Alternatively, the step of acquiring the transmit signal group and/or the antenna port group corresponding to the QCL characteristic parameter set and determining the channel information corresponding to the current transmit signal and/or the current antenna port according to the transmit signal group and/or the antenna port group includes: determining characteristic parameters of X QCL signal groups or X QCL antenna port groups to which the current transmit signal or the current antenna port belongs according to the QCL characteristic parameter set. The characteristic parameters are used for determining the channel information corresponding to the current transmit signal and/or the current antenna port, and the characteristic parameters in X characteristic parameter groups are configured as follows. When X=1, the characteristic parameter group includes the average delay, the average gain, the frequency offset, the frequency offset spread and the delay spread. When X=2, a first characteristic parameter group includes the average delay and the frequency offset and a second characteristic parameter group includes the frequency offset spread and the delay spread; alternatively the first characteristic parameter group includes the average delay, the frequency offset, the frequency offset spread, and the delay spread and the second characteristic parameter group includes the average gain;

alternatively the first characteristic parameter group includes the average delay and the delay spread and the second characteristic parameter group includes the frequency offset and the frequency offset spread. When X=3, a first characteristic parameter group includes the average delay and the delay spread, a second characteristic parameter group includes the frequency offset and the frequency offset spread and a third characteristic parameter group includes the average gain; alternatively the first characteristic parameter group includes the average delay and the frequency offset, the second characteristic parameter group includes the delay spread and the frequency offset spread and the third characteristic parameter group includes the average gain.

A system specifies the signal group with the QCL relationship or the port group with the QCL relationship according to a currently used configuration manner of QCL parameter sets.

Figure 5:
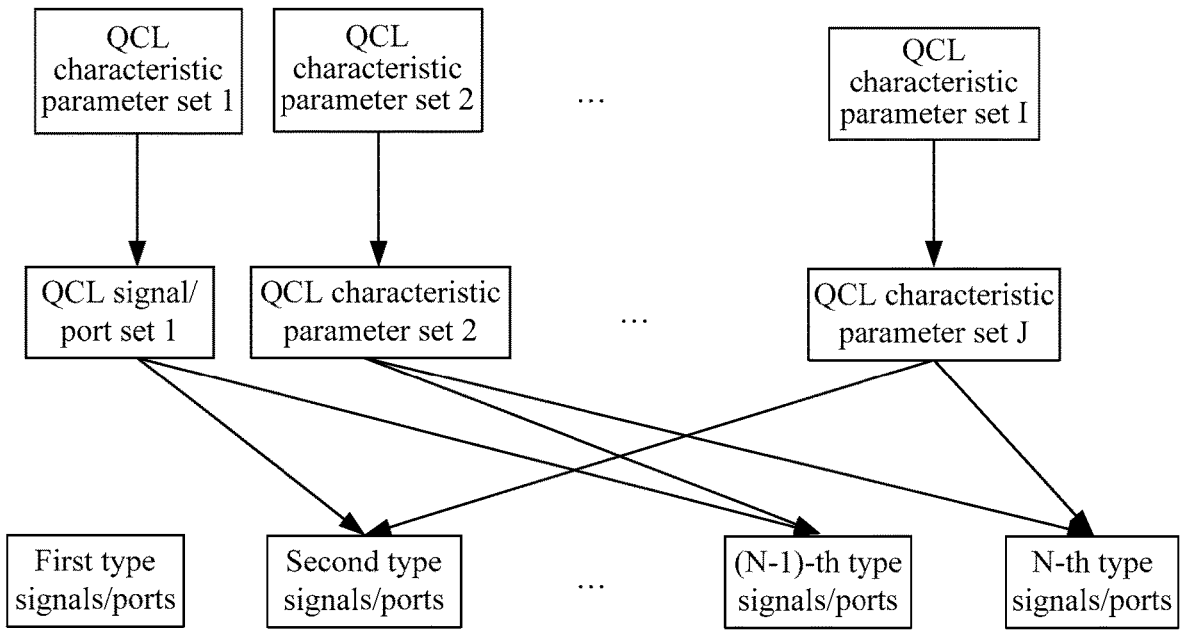
FIG. 5 is a schematic diagram of a QCL configuration state according to an embodiment of the present disclosure.

As shown in FIG. 5, one signal group may belong to one or more QCL signal groups, this signal group and all signals in the one or more QCL signal groups have the channel characteristics in the QCL parameter set corresponding to the one or more QCL signal groups. For example, second type signals correspond to a QCL signal set 1 and a QCL signal set J, that is, the second type signals have correspondences with a QCL characteristic parameter set 1 and a QCL characteristic parameter set I. One port group may belong to one or more QCL port groups, and this port group and all ports in the one or more QCL port groups have channel characteristics in a QCL parameter set corresponding to the one or more QCL port groups. For example, an N-th type of port respectively corresponds to a QCL signal set 2 and the QCL signal set J, that is, the N-th type of port correspond to the QCL characteristic parameter set 2 and the QCL characteristic parameter set I.

A system specifies signal groups or port groups with QCL relationships according to a currently used configuration manner of QCL parameter sets.

As shown in FIG. 5, one signal group may belong to one or more QCL signal groups, and this signal group and all signals in the one or more QCL signal groups have channel characteristics included in the QCL parameter set corresponding to the one or more QCL signal groups. For example, the second type signals correspond to a QCL signal set 1 and a QCL signal set J, that is, the second type signals have correspondences with a QCL characteristic parameter set 1 and a QCL characteristic parameter set I. One port group may belong to one or more QCL port groups, and this port group and all ports in the one or more QCL port groups have channel characteristics in a QCL parameter set corresponding to the one or more QCL port groups. For example, an N-th type of port respectively corresponds to a QCL signal set 2 and the QCL signal set J, that is, the N-th type of port has correspondences with the QCL characteristic parameter set 2 and the QCL characteristic parameter set I.

Figure 6:
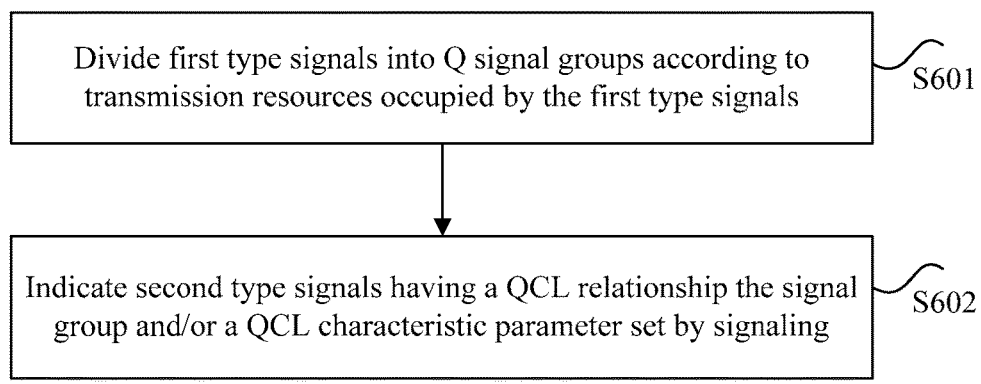
FIG. 6 is a flowchart of a method for representing a QCL parameter configuration according to an embodiment of the present disclosure.

The embodiments of the present disclosure further provide a method of representing a QCL parameter configuration. FIG. 6 is a flowchart of a method of representing a QCL parameter configuration according to an embodiment of the present disclosure. As shown in FIG. 2, the method includes the steps described below.

In step S601, first type signals are divided into Q signal groups according to transmission resources occupied by the first type signals. The first type signals includes multiple signals and Q is a positive integer.

In step S602, second type signals with a QCL relationship with the signal group and/or a QCL characteristic parameter set are indicated by signaling.

In the above embodiment, the first type signals are divided into the Q signal groups according to the occupied transmission resources, where the first type of signals includes multiple signals and Q is a positive integer; and the second type signals with a QCL relationship with the signal group and/or the QCL characteristic parameter set are indicated by the signaling, thereby solving the technical problem in the existing art that QCL information between different reference signals or different antenna ports cannot be flexibly configured and achieving an effect of flexibly configuring the QCL information between different reference signals or different antenna ports.

The above steps may be executed by a transmitting terminal such as a base station, a micro base station and a mobile base station.

Alternatively, the signaling needs to include a grouping manner of the first type signals and QCL sets. When acquiring the information, the receiving terminal may perform channel estimation by using signal sets associated with the Q signal groups and obtain channel characteristics.

Alternatively, transmission resources of the first type signals include at least one of antenna ports, frequency domain resources, or time domain resources.

Alternatively, the first type signals or the second type signals includes at least one of: a downlink synchronization signal, an uplink random access signal, a downlink data demodulation pilot signal, a downlink control demodulation pilot signal, a downlink measurement pilot signal, an uplink data demodulation pilot signal, an uplink control demodulation pilot signal or an uplink measurement pilot signal.

Alternatively, the QCL characteristic parameter set includes at least one of an average delay, an average gain, a frequency offset, frequency offset spread, a spatial parameter or delay spread.

Alternatively, the spatial parameter may be an angle of arrival, an average angle of arrival, a spatial correlation, an angle of departure and an average angle of departure.

Alternatively, the step of indicating the second type signals with the QCL relationship with the signal group and/or the QCL characteristic parameter set by the signaling includes: for each of the Q signal groups, indicating, by at least one set of higher-layer signaling or at least one set of physical-layer signaling, the QCL signal set and/or the QCL characteristic parameter set to which the signal group belongs, where the QCL signal set includes the second type signals. Therefore, signals with the QCL relationship with each signal group are indicated by the signaling.

For example, as shown in table 2:

When a group of downlink data demodulation pilot signals are transmitted by using a same analog beam and a same RF device, the transmitting terminal configures a QCL parameter set represented by a QCL parameter set type 5 for these reference signals.

In one embodiment, when the transmission configuration or resource corresponding to the above signal or port is uniquely determined, QCL parameters corresponding to the signals or the ports may be represented in an agreed manner between the transmitting terminal and the receiving terminal, and the signaling does not need to indicate the reference signal.

When the same RF element is used to transmit the downlink data demodulation pilot signal and the downlink measurement pilot for measuring the phase noise and the analog beam is not used or different analog beams are used, the transmitting terminal configures a QCL parameter set represented by a QCL parameter set type 2 for these reference signals.

When the downlink data demodulation pilot signal and the downlink measurement pilot for measuring the phase noise are transmitted by using the same RF element and the same analog beam or the same RF element and similar analog beams, a QCL parameter set represented by a QCL parameter set type 2' or 4 or 4' may be configured.

In one embodiment, when the transmission configuration or resource corresponding to the signal or the port is uniquely determined, the QCL parameters corresponding to the signal or the port may be represented in the agreed manner between the transmitting terminal and the receiving terminal, and does not need to be indicated by signaling.

When a downlink synchronization pilot and the downlink measurement pilot are transmitted by different RF devices or transmitting nodes, the transmitting terminal configures a QCL parameter set represented by a QCL parameter set type 1 for these signals.

In one embodiment, when the downlink synchronization pilot and the downlink measurement pilot are transmitted by a same RF device or transmitting node, a QCL parameter set represented by a QCL parameter set type 2 or 2' may be configured for these reference signals.

In one embodiment, when the downlink synchronization pilot and the downlink measurement pilot are transmitted by using a same analog beam or similar analog beams, a QCL parameter set represented by a QCL parameter set type 4 or 4' may be configured for these reference signals.

In one embodiment, when the transmission configuration or resource corresponding to the above signal or port is uniquely determined, the QCL parameters corresponding to the signal or port may be represented in the agreed manner between the transmitting terminal and the receiving terminal, and does not need to be indicated by signaling.

With respect to the above method (including the step S601 and the step S602) for the transmitting terminal, in an aspect of the embodiments of the present disclosure, a method for representing a QCL parameter configuration is provided and the method is applied to a receiving terminal. The method includes the steps described below. A grouping manner of first type signals and a QCL characteristic parameter set and/or a QCL signal set to which each of Q signal groups of the first type signals belongs are determined by demodulating signaling from a transmitting terminal. Channel information corresponding to a current transmit signal and/or a current antenna port is determined according to the QCL characteristic parameter set and/or the QCL signal set.

The above method is applied to the receiving terminal (a receiving device) such as a user terminal and a mobile terminal, for example, a mobile phone, a tablet computer, etc.

Alternatively, the step of determining the channel information corresponding to the current transmit signal and/or the current antenna port according to the QCL characteristic parameter set and/or the QCL signal set includes acquiring one or more channel parameters corresponding to the first type signals from the QCL characteristic parameter set and/or the QCL signal set to which each of the Q signal groups belongs and determining the channel information of the current transmit signal and/or the current antenna port according to the one or more channel parameters.

The transmission resource position occupied by the references signal may be configured by a system according to QCL signal set to which the reference signal belongs.

Figure 7:
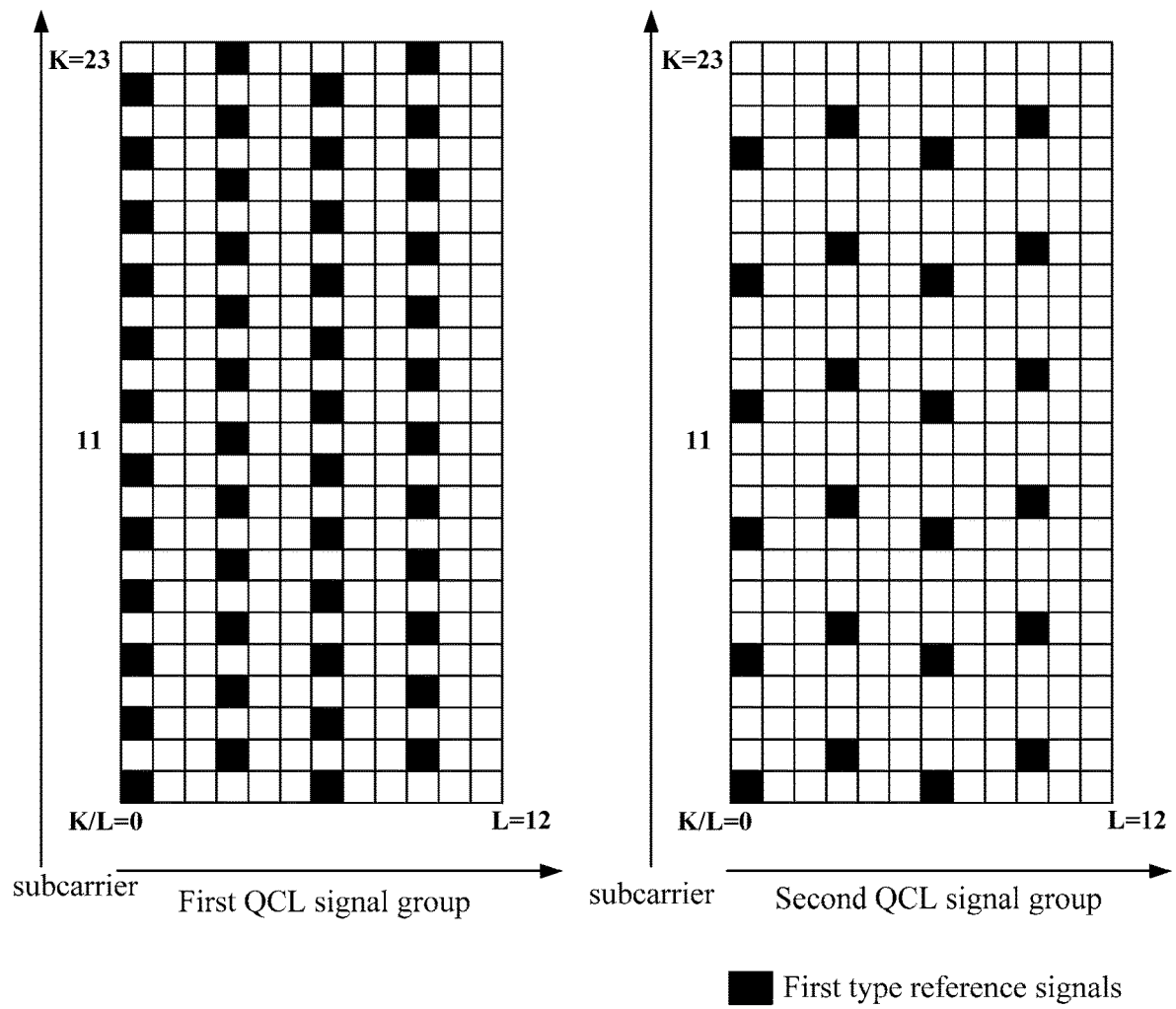
FIG. 7 is a schematic diagram illustrating a distribution of resources occupied by signals according to an embodiment of the present disclosure.

As shown in FIG. 7, when an average delay and delay spread of the first type reference signal cannot be effectively estimated by the QCL signal set to which the first type reference signal belongs, the first type reference signal occupies transmission resource positions in frequency domain shown on a left half of FIG. 7. However, when the QCL signal set to which the first type reference signal belongs includes signals for effectively estimating the channel on which the first type reference signal is transmitted, the first type reference signal occupies transmission resource positions shown on a right half of FIG. 7.

In addition, the density of resources occupied by the reference signal in the frequency domain or space domain may also be independently or jointly adjusted according to a similar scheme.

It should be noted that, in FIG. 7, when a receiver demodulates data, the receiver needs to at least know, according to the reference signal, the following information of the current channel: a frequency offset, a time offset, frequency selective fading and the like. Then, the receiver needs to know the following characteristics: the frequency offset, the time offset and high frequency phase noise. These characteristics have different requirements on the density of reference signal (RS) in time domain and frequency domain. The frequency offset and the phase noise require a high density in the time domain. The time offset requires that the RS has a high density in the frequency domain. Therefore, for one type of reference signal such as downlink demodulation reference signal (DMRS) (the signal shown in FIG. 7), when there is no reference signal having the QCL characteristics with the DMRS with respect to the frequency offset or the time offset, to accurately estimate the signal, the density of the DMRS in different domains needs to be adjusted and additional resources are added (such as a dense distribution similar to that shown on the left half of FIG. 7). When there exists currently a signal have the QCL relationship with the DMRS with respect to the frequency offset or the time offset, the DMRS may reuse results of the measured frequency offset or time offset of this signal so that the frequency offset or the time offset of the DMRS does not need to be measured, and thus the density of the DMRS will decrease (such as a sparse distribution shown on the right half of FIG. 7).

Figure 9:
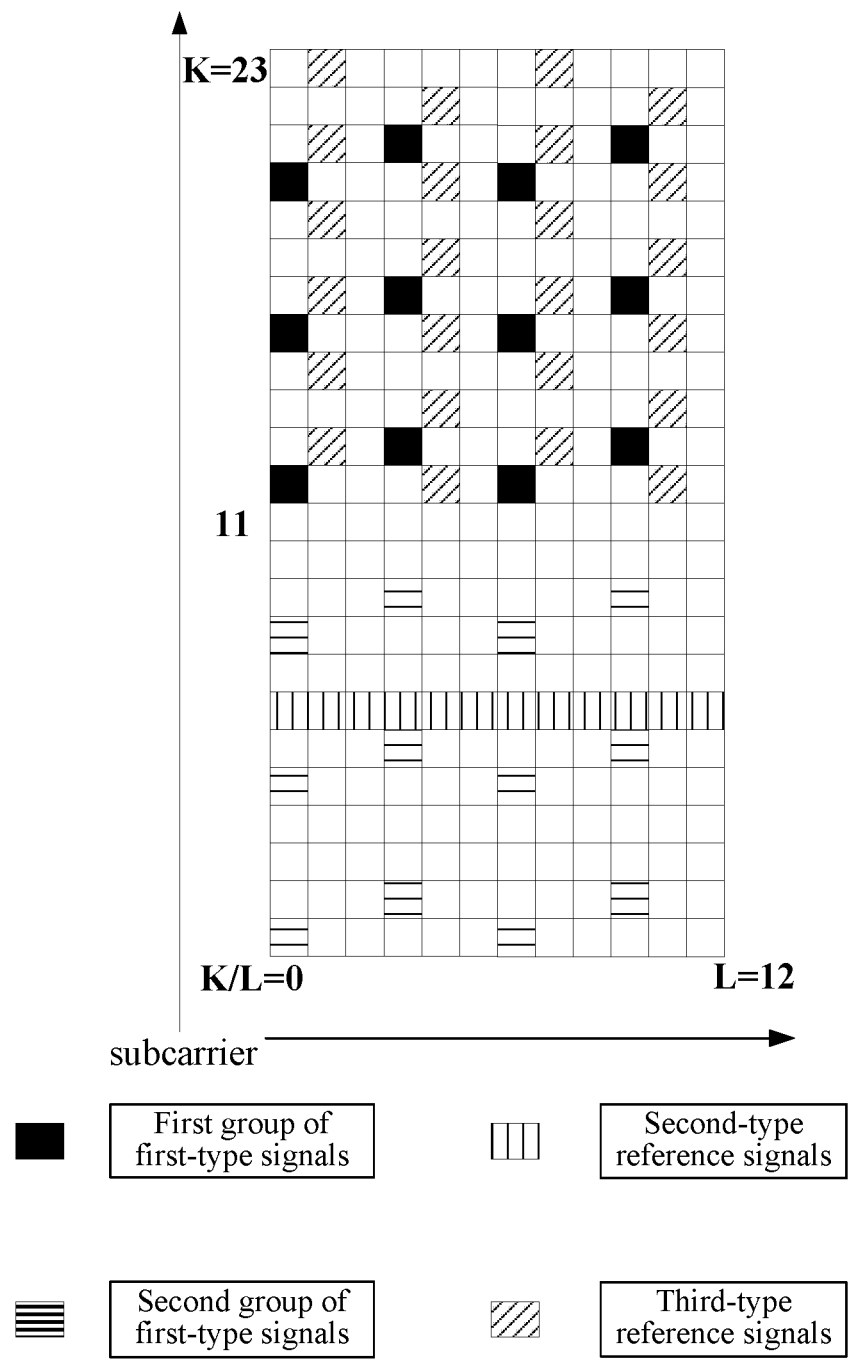
FIG. 9 is a schematic diagram illustrating a distribution of resources occupied by reference signals according to an embodiment of the present disclosure.

In FIG. 7 and FIG. 9, a vertical axis represents the subcarrier K and a horizontal axis represents a symbol number L.

Alternatively, a base station may configure a distribution of the first type signal on different resources according to the QCL signal set to which the first type signal belongs or the QCL characteristic parameter set corresponding to the first type signal.

Reference signals of a same type and at different resource positions may constitute a QCL reference signal group with different reference signals to acquire multiple parameters of a channel of the reference signal.

Figure 8:
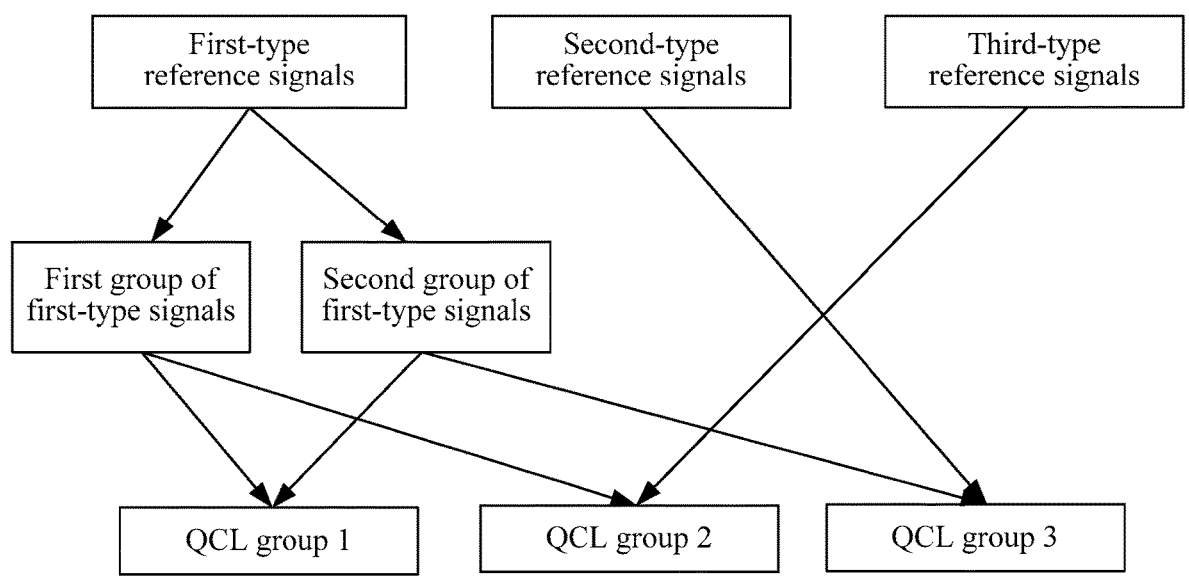
FIG. 8 is a schematic diagram of QCL configurations of reference signals according to an embodiment of the present disclosure.

As shown in FIG. 8, the first type reference signals may be divided into two subtypes (that is, a first group of first type signals and a second group of first type signals) according to different frequency domain positions occupied by the first type reference signals. The first subtype (the first group) and third type reference signals belong to a same QCL reference signal group (a QCL group 2). The second subtype (the second group) and the second type reference signals belong to a same QCL reference signal group (a QCL group 3). In this configuration, the two subtypes also belong to a same QCL reference signal group (a QCL group 1).

In this configuration, as shown in FIG. 9, a terminal may effectively estimate Doppler-related characteristics of the channel of the first type reference signal according to information of a second QCL reference group and effectively estimate delay-related characteristics of the channel of the first type reference signal according to information of a third QCL reference group.

In addition, the first type reference signal may also be independently grouped or grouped with other signal according to the resource position in the frequency domain or the space domain occupied by the first type reference signal, and constitute the QCL relationship with other reference signals.

Alternatively, the base station may configure a corresponding QCL parameter set for currently transmitted signals or ports participating in the transmission according to the group result of the currently transmitted signals or the ports participating in the transmission made by the terminal according to the channel measurement result.

For example, in an application scenario where both the transmitting terminal and the receiving terminal use multi beams, the terminal groups the currently transmitted signals or the ports participating in the transmission according to measured channel characteristics such as an angle of arrival, an angle of departure or a combination thereof and feeds back the group to the base station. The base station may configure the corresponding QCL parameter set for the currently transmitted signals or the ports participating in the transmission according to the feedback information so that the signals or ports participating in the transmission have "QCL beam relationship".

For example, as shown in table 2, when a group of downlink measurement pilots from a same transmitting terminal or different transmitting terminals is received by a same receive beam at the receiving terminal, according to a feedback result of the receiving terminal, the transmitting terminal may configure a QCL parameter set represented by a QCL parameter set type 6 for the group of downlink measurement pilots. Since the group of downlink measurement pilots are transmitted by different beams and RE devices, the QCL parameter set only includes a spatial parameter.

Alternatively, the base station may configure different QCL parameter sets for antenna ports participating in transmission according to a transmission mode used by the terminal according to a current system.

For example, the base station may configure different QCL parameter sets (such as a transmitting angle, a receiving angle and an average gain) for current antenna ports participating in uplink and downlink transmission and accordingly indicate that the current antenna ports have the QCL relationship.

A strength of these QCL relationship, that is, the number of parameters included in the QCL parameter set, reflects a level of reciprocity between the uplink and the downlink in the current system. That is, when uplink and downlink channels of the system have complete reciprocity, uplink ports and downlink ports may have the QCL relationship with respect to all QCL parameter sets. When the uplink and downlink channels of the system have incomplete reciprocity calibration, for example, different crystal oscillators or RF links are used, the uplink and downlink ports may have the QCL relationship with respect to the QCL parameter set not including the time offset and Doppler frequency offset. For example, when uplink signals are transmitted by using a same analog beam as that used for receiving downlink signals, the uplink and downlink signals and ports may have a QCL relationship with respect to the spatial parameter.

For example, when a same RF link and different beam combinations are used, the uplink and downlink ports may have QCL relationships with respect to other QCL parameter sets except an angle. Alternatively, other combinations are included. When the uplink and downlink channels of the system have no reciprocity, the uplink and downlink ports have no QCL relationship.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the methods according to each embodiment of the present disclosure.

Embodiment 2

The embodiments of the present disclosure further provide a device for representing a QCL parameter configuration. The device is configured to implement the above-mentioned embodiments and preferred implementation modes. What has been described will not be repeated. As used below, the term "module" may be software, hardware or a combination thereof capable of implementing predetermined functions. The apparatuses in the embodiments described below are preferably implemented by software, but implementation by hardware or by a combination of software and hardware is also possible and conceived.

Figure 10:
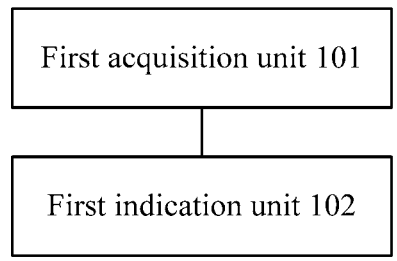
FIG. 10 is a block diagram of a device for representing a QCL parameter configuration according to an embodiment of the present disclosure.

FIG. 10 is a block diagram of a device for representing a QCL parameter configuration according to an embodiment of the present disclosure. As shown in FIG. 10, the device includes a first acquisition unit 101 and a first indication unit 102.

The first acquisition unit 101 is configured to acquire a second QCL characteristic parameter set including part or all of characteristic parameters in a first QCL characteristic parameter set.

The first indication unit 102 is configured to indicate configuration information of the second QCL characteristic parameter set to a receiving terminal by signaling.

In the above embodiment, the first acquisition unit acquires the second QCL characteristic parameter set including part or all of the characteristic parameters in the first QCL characteristic parameter set; and the first indication unit indicates the configuration information of the second QCL characteristic parameter set to the receiving terminal by the signaling, thereby solving the technical problem in the existing art that QCL information between different reference signals or different antenna ports cannot be flexibly configured and achieving an effect of flexibly configuring the QCL information between different reference signals or different antenna ports.

Alternatively, the preceding device for representing the QCL parameter configuration may be applied to a transmitting device at a transmitting terminal, such as a base station, a micro base station and a mobile base station.

Alternatively, the characteristic parameters are used for representing characteristics of a radio propagation channel and include at least one of an average delay, an average gain, a frequency offset, frequency offset spread, a spatial parameter or delay spread.

Alternatively, the spatial parameter may be an angle of arrival, an average angle of arrival, a spatial correlation, an angle of departure and an average angle of departure.

Alternatively, the characteristic parameters are used for representing a QCL mode between signals or antenna ports.

The first acquisition unit is further configured to acquire the second QCL characteristic parameter sets configured respectively for L signals or L antenna ports, where each of the L signals or L antenna ports corresponds to at least one second QCL characteristic parameter set, where L is a positive integer.

The first acquisition unit is further configured to: acquire the second QCL characteristic parameter set including N characteristic parameter groups of the first QCL characteristic parameter set, where the first QCL characteristic parameter set includes M characteristic parameter groups, N is a positive number greater than 0 and less than or equal to M and M is a positive integer; select a first characteristic parameter from the first QCL characteristic parameter set according to a QCL mode between current transmit signals and add the first characteristic parameter to the second QCL characteristic parameter set; select a second characteristic parameter from the first QCL characteristic parameter set according to a transmission mode and add the second characteristic parameter to the second QCL characteristic parameter set; and select a third characteristic parameter from the first QCL characteristic parameter set according to feedback information from a terminal and add the third characteristic parameter to the second QCL characteristic parameter set.

Alternatively, before the second QCL characteristic parameter set including N characteristic parameter groups of the first QCL characteristic parameter set is acquired, the first QCL characteristic parameter set is divided into the M characteristic parameter groups according to an agreement with the receiving terminal, where each of the M characteristic parameter groups includes m types of characteristic parameters, where m is a positive integer.

The first indication unit, which indicates the configuration information of the second QCL characteristic parameter set to the receiving terminal by the signaling, is further configured to send higher-layer signaling for indicating characteristic parameters or characteristic parameter groups in the second QCL characteristic parameter set to the receiving terminal.

The first indication unit, which indicates the configuration information of the second QCL characteristic parameter set to the receiving terminal by the signaling, is further configured to indicate, via preset signaling, a signal set with a QCL relationship or an antenna port set with a QCL relationship and to which the second QCL characteristic parameter set is applicable, where the preset signaling includes the higher-layer signaling and/or physical-layer signaling.

In an aspect of the embodiments of the present disclosure, a device for representing a QCL parameter configuration is provided and the device is applied to a receiving terminal. The device includes a first determining unit and a second determining unit. The first determining unit is configured to determine a QCL characteristic parameter set used in current transmission by demodulating signaling of a transmitting terminal. The second determining unit is configured to acquire a transmit signal group and/or an antenna port group corresponding to the QCL characteristic parameter set and determine channel information corresponding to a current transmit signal and/or a current antenna port according to the transmit signal group and/or the antenna port group.

The preceding device is applied to the receiving terminal (a receiving device) such as a user terminal and a mobile terminal, for example, a mobile phone, a tablet computer, etc.

Alternatively, characteristic parameters in the QCL characteristic parameter set and the channel information are used for characterizing a radio propagation channel.

Alternatively, the characteristic parameters include at least one of an average delay, an average gain, a frequency offset, frequency offset spread, a spatial parameter or delay spread.

Alternatively, the spatial parameter may be an angle of arrival, an average angle of arrival, a spatial correlation, an angle of departure and an average angle of departure.

Alternatively, signal types of transmit signals in the transmit signal group includes: a downlink synchronization signal, an uplink random access signal, a downlink data demodulation pilot signal, a downlink control demodulation pilot signal, a downlink measurement pilot signal, an uplink data demodulation pilot signal, an uplink control demodulation pilot signal and an uplink measurement pilot signal.

Alternatively, the antenna port group includes one of: a port configured to send the downlink synchronization signal, a port configured to send the uplink random access signal, a port configured to send the downlink data demodulation pilot signal, a port configured to send the downlink control demodulation pilot signal, a port configured to send the downlink measurement pilot signal, a port configured to send the uplink data demodulation pilot signal, a port configured to send the uplink control demodulation pilot signal, a port configured to send the uplink measurement pilot signal, a port configured to send uplink user data, a port configured to send downlink user data, a port configured to send uplink user control information and a port configured to send downlink user control information.

Alternatively, the second determining unit is further configured to acquire channel information of at least one transmit signal group and/or at least one antenna port group corresponding to at least one QCL characteristic parameter set.

Alternatively, the device further includes a measurement unit and a feedback unit. The measurement unit is configured to measure the channel information of the current transmit signal and/or the current antenna port. The feedback unit is configured to feed back a QCL characteristic parameter set of the current transmit signal and/or the current antenna port to the transmitting terminal.

Figure 11:
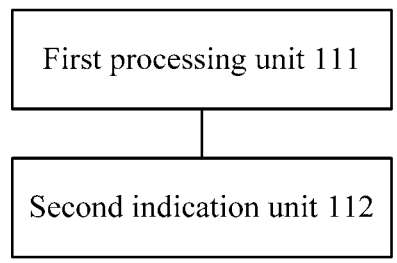
FIG. 11 is a block diagram of a device for representing a QCL parameter configuration according to an embodiment of the present disclosure.

The embodiments of the present disclosure further provide a device for representing a QCL parameter configuration. FIG. 11 is a block diagram of a device for representing a QCL parameter configuration according to an embodiment of the present disclosure. As shown in FIG. 11, the device includes a first processing unit 111 and a second indication unit 112.

The first processing unit 111 is configured to, according to X characteristic parameter groups, divide all transmit signals into X signal groups each of which is with a QCL relationship or divide all antenna ports into X antenna port groups each of which is with a QCL relationship.

The second indication unit 112 is configured to indicate configuration information of the X signal groups or X antenna port groups to a receiving terminal by signaling.

The preceding device may be applied to a transmitting terminal such as a base station, a micro base station and a mobile base station.

There are various dynamic characteristic parameter configuration methods, one is to number these QCL characteristic parameters and indicate the numbers of theses characteristic parameters in the signaling. When an agreement or the like is adopted, possible combinations of these QCL characteristic parameters are exhaustively listed and numbered, and then only the number of a currently used combination is to be notified by the signaling.

Alternatively, characteristic parameters in the characteristic parameter group include at least one of: an average delay, an average gain, a frequency offset, frequency offset spread, a spatial parameter or delay spread.

Alternatively, the spatial parameter may be an angle of arrival, an average angle of arrival, a spatial correlation, an angle of departure and an average angle of departure.

Alternatively, the characteristic parameters in the characteristic parameter groups are configured as follows. When X=1, the characteristic parameter group includes the average delay, the average gain, the frequency offset, the frequency offset spread and the delay spread. When X=2, a first characteristic parameter group includes the average delay and the frequency offset and a second characteristic parameter group includes the frequency offset spread and the delay spread; alternatively the first characteristic parameter group includes the average delay, the frequency offset, the frequency offset spread, and the delay spread and the second characteristic parameter group includes the average gain; alternatively the first characteristic parameter group includes the average delay and the delay spread and the second characteristic parameter group includes the frequency offset and the frequency offset spread. When X=3, a first characteristic parameter group includes the average delay and the delay spread, a second characteristic parameter group includes the frequency offset and the frequency offset spread and a third characteristic parameter group includes the average gain; alternatively the first characteristic parameter group includes the average delay and the frequency offset, the second characteristic parameter group includes the delay spread and the frequency offset spread and the third characteristic parameter group includes the average gain.

Alternatively, the characteristic parameters may be grouped in one of the following manners: all the characteristic parameters are grouped into the X characteristic parameter groups according to an agreement with the receiving terminal; all the characteristic parameters are grouped into the X characteristic parameter groups according to a preset configuration stored locally; and all the characteristic parameters are grouped into the X characteristic parameter groups according to feedback information from the receiving terminal.

Alternatively, the transmit signals include: a downlink synchronization signal, an uplink random access signal, a downlink data demodulation pilot signal, a downlink control demodulation pilot signal, a downlink measurement pilot signal, an uplink data demodulation pilot signal, an uplink control demodulation pilot signal and an uplink measurement pilot signal.

Alternatively, the signal groups include at least one of: signals of a same type and sent through different ports; signals of a same type and periodically and aperiodically sent; signals of a same type and sent at different transmission time positions through a same signal port; signals of a same type and sent at different transmission frequency domain positions through a same signal port; signals of different types; or signals of different types periodically and aperiodically sent.

Alternatively, the second indication unit 112 is further configured to indicate, by one or more sets of instructions, I signal groups to which any type of signals belongs to the receiving terminal, where the I signal groups have different QCL relationships and I is a positive integer greater than 0 and less than or equal to X.

Alternatively, the antenna ports include one of: a port configured to send the downlink synchronization signal, a port configured to send the uplink random access signal, a port configured to send the downlink data demodulation pilot signal, a port configured to send the downlink control demodulation pilot signal, a port configured to send the downlink measurement pilot signal, a port configured to send the uplink data demodulation pilot signal, a port configured to send the uplink control demodulation pilot signal, a port configured to send the uplink measurement pilot signal, a port configured to send uplink user data, a port configured to send downlink user data, a port configured to send uplink user control information and a port configured to send downlink user control information.

Alternatively, the antenna port groups include at least one of: different ports through which signals of a same type are sent at different transmission time positions; different ports through which signals of a same type are sent at different transmission frequency domain positions; different ports through which signals of different types are sent at different transmission time positions; or different ports through which signals of different types are sent at different transmission frequency domain positions.

Alternatively, the second indication unit 112 is further configured to indicate, by the one or more sets of instructions, J antenna port groups to which any type of signals belongs to the receiving terminal, where the J antenna port groups have different QCL relationships and J is a positive integer greater than 0 and less than or equal to X.

Alternatively, the device further includes a configuration unit. The configuration unit is configured to configure resources for transmitting each of first type signals according to a QCL signal set to which the first type signals belong and/or a QCL characteristic parameter set corresponding to the first type signals.

Accordingly, in another aspect of the embodiments of the present disclosure, an device for representing a QCL parameter configuration is provided and the device is applied to a receiving terminal. The device includes a third determining unit and a fourth determining unit. The third determining unit is configured to determine a QCL characteristic parameter set used in current transmission by demodulating signaling of a transmitting terminal. The fourth determining unit is configured to acquire a transmit signal group and/or an antenna port group corresponding to the QCL characteristic parameter set and determine channel information corresponding to a current transmit signal and/or a current antenna port according to the transmit signal group and/or the antenna port group.

The preceding device is applied to the receiving terminal (a receiving device) such as a user terminal and a mobile terminal, for example, a mobile phone, a tablet computer, etc.

Alternatively, characteristic parameters in the QCL characteristic parameter set and the channel information are used for representing characteristics of a radio propagation channel.

Alternatively, the characteristic parameters include at least one of an average delay, an average gain, a frequency offset, frequency offset spread, a spatial parameter or delay spread.

Alternatively, the spatial parameter may be an angle of arrival, an average angle of arrival, a spatial correlation, an angle of departure and an average angle of departure.

Alternatively, signal types of transmit signals in the transmit signal group include: a downlink synchronization signal, an uplink random access signal, a downlink data demodulation pilot signal, a downlink control demodulation pilot signal, a downlink measurement pilot signal, an uplink data demodulation pilot signal, an uplink control demodulation pilot signal and an uplink measurement pilot signal.

Alternatively, the antenna port group includes one of: a port configured to send the downlink synchronization signal, a port configured to send the uplink random access signal, a port configured to send the downlink data demodulation pilot signal, a port configured to send the downlink control demodulation pilot signal, a port configured to send the downlink measurement pilot signal, a port configured to send the uplink data demodulation pilot signal, a port configured to send the uplink control demodulation pilot signal, a port configured to send the uplink measurement pilot signal, a port configured to send uplink user data, a port configured to send downlink user data, a port configured to send uplink user control information and a port configured to send downlink user control information.

Alternatively, the fourth determining unit is further configured to determine characteristic parameters of X QCL signal groups or X QCL antenna port groups to which the current transmit signal or the current antenna port belongs according to the QCL characteristic parameter set. The characteristic parameters are used for determining the channel information corresponding to the current transmit signal and/or the current antenna port. The characteristic parameter in X characteristic parameter groups are configured in the following manners. When X=1, the characteristic parameter group includes the average delay, the average gain, the frequency offset, the frequency offset spread and the delay spread. When X=2, a first characteristic parameter group includes the average delay and the frequency offset and a second characteristic parameter group includes the frequency offset spread and the delay spread; alternatively the first characteristic parameter group includes the average delay, the frequency offset, the frequency offset spread, and the delay spread and the second characteristic parameter group includes the average gain; alternatively the first characteristic parameter group includes the average delay and the delay spread and the second characteristic parameter group includes the frequency offset and the frequency offset spread. When X=3, a first characteristic parameter group includes the average delay and the delay spread, a second characteristic parameter group includes the frequency offset and the frequency offset spread and a third characteristic parameter group includes the average gain; alternatively the first characteristic parameter group includes the average delay and the frequency offset, the second characteristic parameter group includes the delay spread and the frequency offset spread and the third characteristic parameter group includes the average gain.

Figure 12:
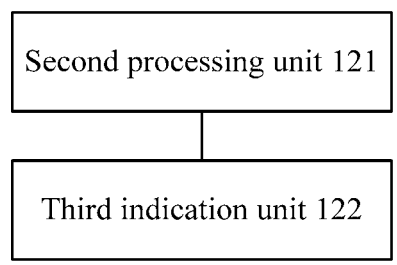
FIG. 12 is a block diagram of a device for representing a QCL parameter configuration according to an embodiment of the present disclosure.

The embodiments of the present disclosure further provide a device for representing a QCL parameter configuration. FIG. 12 is a block diagram of the device for representing a QCL parameter configuration according to an embodiment of the present disclosure. As shown in FIG. 12, the device includes a second processing unit 121 and a third indication unit 122.

The second processing unit 121 is configured to divide first type signals into Q signal groups according to transmission resources occupied by the first type signals, where the first type signals include a plurality of signals and Q is a positive integer.

The third indication unit 122 is configured to indicate second type signals having a QCL relationship with the signal group and/or a QCL characteristic parameter set by signaling.

In the above embodiment, the second processing unit divides the first type signals into Q signal groups according to the occupied transmission resources, where the first type signals include a plurality of signals and Q is a positive integer; and the third indication unit indicates the second type signals with the QCL relationship with the signal group and/or the QCL characteristic parameter set by the signaling, thereby solving the technical problem in the existing art that QCL information between different reference signals or different antenna ports cannot be flexibly configured and achieving an effect of flexibly configuring the QCL information between different reference signals or different antenna ports.

The preceding device may be applied to a transmitting terminal such as a base station, a micro base station and a mobile base station.

Alternatively, the signaling needs to include a grouping manner of the first type signals and the QCL sets. When acquiring this information, the receiving terminal may perform channel estimation by further using signal associated with the Q signal groups and obtain channel characteristics.

Alternatively, transmission resources of the first type signals include at least one of antenna ports, frequency domain resources or time domain resources.

Alternatively, the first type signals or the second type signals includes at least one of: a downlink synchronization signal, an uplink random access signal, a downlink data demodulation pilot signal, a downlink control demodulation pilot signal, a downlink measurement pilot signal, an uplink data demodulation pilot signal, an uplink control demodulation pilot signal, or an uplink measurement pilot signal.

Alternatively, characteristic parameters in the QCL characteristic parameter set include at least one of an average delay, an average gain, a frequency offset, frequency offset spread, a spatial parameter, or delay spread.

Alternatively, the spatial parameter may be an angle of arrival, an average angle of arrival, a spatial correlation, an angle of departure and an average angle of departure.

Alternatively, the third indication unit 122 is further configured to indicate, by at least one set of higher-layer signaling or at least one set of physical-layer signaling, for each of the Q signal groups, a QCL signal set and/or the QCL characteristic parameter set to which the signal group belongs, where the QCL signal set includes the second type signals. Therefore, signals with the QCL relationship with each signal group are indicated by the signaling.

Accordingly, in another aspect of the embodiments of the present disclosure, a device for representing a QCL parameter configuration is provided and the device is applied to a receiving terminal. The device includes a fifth determining unit and a sixth determining unit. The fifth determining unit is configured to determine, by demodulating signaling of a transmitting terminal, a grouping manner of first type signals and a QCL characteristic parameter set and/or a QCL signal set to which each of Q signal groups of the first type signals belongs. The sixth determining unit is configured to determine channel information corresponding to a current transmit signal and/or a current antenna port according to the QCL characteristic parameter set and/or the QCL signal set.

The preceding device is applied to the receiving terminal (a receiving device) such as a user terminal and a mobile terminal, for example, a mobile phone, a tablet computer, etc.

Alternatively, the sixth determining unit is further configured to acquire one or more channel parameters corresponding to the first type signals from the QCL characteristic parameter set and/or the QCL signal set to which each of the Q signal groups belongs and determine the channel information of the current transmit signal and/or the current antenna port according to the one or more channel parameters.

A transmission resource position occupied by a reference signal may be configured by a system according to the QCL signal set to which the reference signal belongs.

It is to be noted that the preceding modules may be implemented by software or hardware. Implementation by hardware may, but may not necessarily, be performed in the following manner: the preceding modules are located in a same processor, or the preceding modules are located in any combination in different processors.

Embodiment 3

In another aspect of the embodiments of the present disclosure, a transmitting apparatus is provided. The transmitting apparatus includes a first processor; a first memory configured to store instructions executable by the first processor; and a first transmission device configured to perform information transmission and reception according to control of the first processor. The first processor is configured to perform the following operations: acquiring a second QCL characteristic parameter set including part or all of characteristic parameters in a first QCL characteristic parameter set; and indicating configuration information of the second QCL characteristic parameter set to a receiving terminal by signaling.

In another aspect of the embodiments of the present disclosure, a receiving apparatus is provided. The receiving apparatus includes a second processor; a second memory configured to store instructions executable by the second processor; and a second transmission device configured to perform information transmission and reception according to control of the second processor. The second processor is configured to perform the following operations: determining a QCL characteristic parameter set used in current transmission by demodulating signaling of a transmitting terminal; acquiring a transmit signal group and/or an antenna port group corresponding to the QCL characteristic parameter set; and determining channel information corresponding to a current transmit signal and/or a current antenna port according to the transmit signal group and/or the antenna port group.

Embodiment 4

The embodiments of the present disclosure further provide a storage medium. Optionally, in the embodiment, the storage medium may be configured to store program codes for executing the steps described below.

In S1, a second QCL characteristic parameter set including part or all of characteristic parameters in a first QCL characteristic parameter set is acquired.

In S2, configuration information of the second QCL characteristic parameter set is indicated to a receiving terminal by signaling.

Alternatively, the storage medium is further configured to store program codes for executing the steps described below.

In S3, according to X characteristic parameter groups, all transmit signals are divided into X signal groups each having a QCL relationship or all antenna ports are divided into X antenna port groups each having a QCL relationship.

In S4, configuration information of the X groups of signal sets or X antenna port groups is indicated to a receiving terminal by signaling.

Alternatively, in the embodiment, the storage medium described above may include, but is not limited to, a USB flash disk, a read-only memory (ROM), a random access memory (RAM), a mobile hard disk, a magnetic disk, an optical disk or another medium capable of storing program codes.

Alternatively, in the embodiment, a processor performs, according to the program codes stored in the storage medium, the following operations: acquiring the second quasi co-location QCL characteristic parameter set including part or all of the characteristic parameter in the first QCL characteristic parameter set; and indicating the configuration information of the second QCL characteristic parameter set to the receiving terminal by the signaling.

Alternatively, in the embodiment, the processor performs, according to the program codes stored in the storage medium, the following operations: according to the X characteristic parameter groups, dividing all the transmit signals into the X signal groups each having a QCL relationship or dividing all antenna ports into the X antenna port groups each having a QCL relationship; and indicating the configuration information of the X signal groups or X antenna port groups to the receiving terminal by the signaling.

Alternatively, for exemplary examples in the present embodiment, reference may be made to the examples described in the embodiments and optional implementation modes described above, and the examples will not be repeated in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executable by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

In the method for representing the QCL parameter configuration according to embodiments of the present disclosure, the second QCL characteristic parameter set including part or all of the characteristic parameters in the first QCL characteristic parameter set is acquired; and the configuration information of the second QCL characteristic parameter set is indicated to the receiving terminal by the signaling, thereby solving the technical problem in the existing art that the QCL information between different reference signals or different antenna ports cannot be flexibly configured and achieving the effect of flexibly configuring the QCL information between different reference signals or different antenna ports.

The invention claimed is:

1. A method for representing a quasi co-location (QCL) parameter configuration, comprising:
acquiring a second QCL characteristic parameter set comprising at least some of characteristic parameters of a first QCL characteristic parameter set,
wherein the characteristic parameters of the first QCL characteristic parameter set represent characteristics of a radio propagation channel, the characteristic parameters comprise an average delay, an average gain, a frequency offset, a frequency offset spread, or a delay spread,
wherein the acquiring the second QCL characteristic parameter set comprises acquiring second QCL characteristic parameter sets configured respectively for L signals,
wherein each of the L signals corresponds to one second QCL characteristic parameter set,
wherein L is a positive integer greater than 1, and
wherein the second QCL characteristic parameter set corresponding to transmit signals has following configuration condition:
when the transmit signals are a combination of a downlink synchronization signal and a downlink measurement pilot, the second QCL characteristic parameter set configured by a transmitting terminal at least comprises the frequency offset and the average delay; and
sending configuration information of the second QCL characteristic parameter set to a receiving terminal,
wherein the sending the configuration information comprises indicating, by preset signaling, signal sets with a QCL relationship and to which the second QCL characteristic parameter set is applicable, and
wherein the signal sets comprise the L signals.

2. The method of claim 1,
wherein the characteristic parameters further comprise a spatial parameter.

3. The method of claim 1, wherein the sending configuration information of the second QCL characteristic parameter set to the receiving terminal comprises:
sending higher-layer signaling that indicates characteristic parameters included in the second QCL characteristic parameter set to the receiving terminal.

4. The method of claim 1,
wherein the preset signaling comprises higher-layer signaling or physical-layer signaling.

5. A device for representing a quasi co-location (QCL) parameter configuration, comprising:
a processor configured to:
acquire a second QCL characteristic parameter set comprising at least some of characteristic parameters of a first QCL characteristic parameter set,
wherein the characteristic parameters of the first QCL characteristic parameter set represent characteristics of a radio propagation channel, the characteristic parameters comprise an average delay, an average gain, a frequency offset, a frequency offset spread, or a delay spread, wherein the second QCL characteristic parameter set is acquired by the processor configured to acquire second QCL characteristic parameter sets configured respectively for L signals,
wherein each of the L signals corresponds to one second QCL characteristic parameter set,
wherein L is a positive integer greater than 1, and
wherein the second QCL characteristic parameter set corresponding to transmit signals has following configuration condition:
when the transmit signals are a combination of a downlink synchronization signal and a downlink measurement pilot, the second QCL characteristic parameter set configured by a transmitting terminal at least comprises a frequency offset and an average delay; and
send configuration information of the second QCL characteristic parameter set to a receiving terminal,
wherein the configuration information is sent by the processor configured to indicate, by preset signaling, signal sets with a QCL relationship and to which the second QCL characteristic parameter set is applicable, and
wherein the signal sets comprise the L signals.

6. The device of claim 5,
wherein the characteristic parameters further comprise a spatial parameter.

7. The device of claim 5, wherein the configuration information of the second QCL characteristic parameter set is sent to the receiving terminal by the processor configured to:
send higher-layer signaling that indicates characteristic parameters included in the second QCL characteristic parameter set to the receiving terminal.

8. The device of claim 5,
wherein the preset signaling comprises higher-layer signaling or physical-layer signaling.

9. A method for representing a quasi co-location (QCL) parameter configuration, comprising:
receiving, by a receiving terminal from a transmitting terminal, a signaling that indicates a configuration information of a second QCL characteristic parameter set,
wherein the second QCL characteristic parameter set is acquired from second QCL characteristic parameter sets that are configured respectively for L signals,
wherein each of the L signals corresponds to one second QCL characteristic parameter set,
wherein L is a positive integer greater than 1,
wherein the receiving the signaling includes receiving, by preset signaling, signal sets with a QCL relationship and to which the second QCL characteristic parameter set is applicable,
wherein the signal sets comprise the L signals, and
wherein the second characteristic QCL parameter set corresponding to transmit signals has following configuration condition:
when the transmit signals are a combination of a downlink synchronization signal and a downlink measurement pilot, the second characteristic QCL parameter set configured by the transmitting terminal at least comprises a frequency offset and an average delay; and
demodulating the signaling to acquire the configuration information of the second QCL characteristic parameter set, wherein the second QCL characteristic parameter set comprises at least some of characteristic parameters of a first QCL characteristic parameter set,
wherein the characteristic parameters of the first QCL characteristic parameter set represent characteristics of a radio propagation channel, the characteristic parameters comprise an average delay, an average gain, a frequency offset, a frequency offset spread, or a delay spread.

10. The method of claim 9,
wherein the characteristic parameters further comprise a spatial parameter.

11. The method of claim 9, wherein the signaling that indicates the configuration information of the second QCL characteristic parameter set is received by:
receiving higher-layer signaling that indicates characteristic parameters included in the second QCL characteristic parameter set.

12. The method of claim 9,
wherein the preset signaling comprises higher-layer signaling or physical-layer signaling.

13. A device for representing a quasi co-location (QCL) parameter configuration, comprising:
a processor configured to:
receive, from a transmitting terminal, a signaling that indicates a configuration information of a second QCL characteristic parameter set,
wherein the second QCL characteristic parameter set is acquired from second QCL characteristic parameter sets that are configured respectively for L signals,
wherein each of the L signals corresponds to one second QCL characteristic parameter set,
wherein L is a positive integer greater than 1,
wherein the signaling is received by the processor configured to receive, by preset signaling, signal sets with a QCL relationship and to which the second QCL characteristic parameter set is applicable,
wherein the signal sets comprise the L signals, and
wherein the second QCL characteristic parameter set corresponding to transmit signals has following configuration condition:
when the transmit signals are a combination of a downlink synchronization signal and a downlink measurement pilot, the second QCL characteristic parameter set configured by the transmitting terminal at least comprises a frequency offset and an average delay; and
demodulate the signaling to acquire the configuration information of the second QCL characteristic parameter set, wherein the second QCL characteristic parameter set comprises at least some of characteristic parameters of a first QCL characteristic parameter set,
wherein the characteristic parameters of the first QCL characteristic parameter set represent characteristics of a radio propagation channel, the characteristic parameters comprise an average delay, an average gain, a frequency offset, a frequency offset spread, or a delay spread.

14. The device of claim 13,
wherein the characteristic parameters further comprise a spatial parameter.

15. The device of claim 13, wherein the processor is configured to receive the signaling that indicates the configuration information of the second QCL characteristic parameter set by being configured to:
receive higher-layer signaling that indicates characteristic parameters included in the second QCL characteristic parameter set.

16. The device of claim 13,
wherein the preset signaling comprises higher-layer signaling or physical-layer signaling.

* * * * *